SINGLE SIDE-BAND MULTICHANNEL CARRIER SYSTEM

Filed May 1, 1958 2 Sheets-Sheet 1

INVENTOR
R. S. CARUTHERS
BY [signature]
ATTORNEY

SINGLE SIDE-BAND MULTICHANNEL CARRIER SYSTEM

Filed May 1, 1958 2 Sheets-Sheet 2

INVENTOR
R. S. CARUTHERS
BY R. P. Morris
ATTORNEY 3,082,296

SINGLE SIDE-BAND MULTICHANNEL CARRIER SYSTEM

Robert S. Caruthers, Mountain Lakes, N.J., assignor to International Telephone and Telegraph Corporation, New York, N.Y., a corporation of Maryland Filed May 1, 1958, Ser. No. 732,306
6 Claims. (Cl. 179—15)

This invention relates to carrier wave systems and more particularly to multi-channel single side-band carrier wave systems for two-way communication.

A single side-band carrier system is known in which the single side-band wave is produced by combining the outputs of two modulating circuits with a ninety degree phase difference in both the carrier and input signal waves to the two modulating elements. Combining of the modulated waves results in the cancellation or balancing out of one of the side-bands and an effective addition of the other side-band.

A single channel two-way transmission system using the above principles has been proposed in which the modulating system serves through the intermediary of hybrid circuits to provide for modulation and demodulation of the carrier and signal for different signal waves from opposite directions, the carrier signals for opposite directions being upper and lower side-bands, respectively.

If more than one signal channel in each direction is desired, however, the prior art systems still require the use of separate carrier frequencies for each two-way signal channel, together with separating filters and separate modulators and demodulators for each carrier frequency.

It is an object of this invention to provide a system using the principles of the systems discussed above, in which two signal channels may be transmitted in each direction, by single side-band carrier, using a single carrier frequency and without requirement of separating filters.

According to a feature of this invention, two signal channels for each direction of transmission are so coupled to a hybrid circuit having opposite terminals connected to modulators, that signals may be applied to or taken from both of the other terminals of the hybrid circuit. Signals for transmission in each direction on the carrier lines are represented by upper and lower side-bands of the carrier, each side-band modulated with a different signal. In order to achieve this result, the voice frequencies constituting the four separate channels are applied over input hybrid circuits and so modulated that upper and lower side-bands are produced from the two signals going in the output direction and upper and lower side-bands representing the other two incoming signals are demodulated in this same circuit to provide the desired voice frequencies which are then segregated by means of the hybrid circuits. The incoming and outgoing signals are presented to opposite sides of the common hybrid circuit so that suitable separation can be obtained between these signals.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
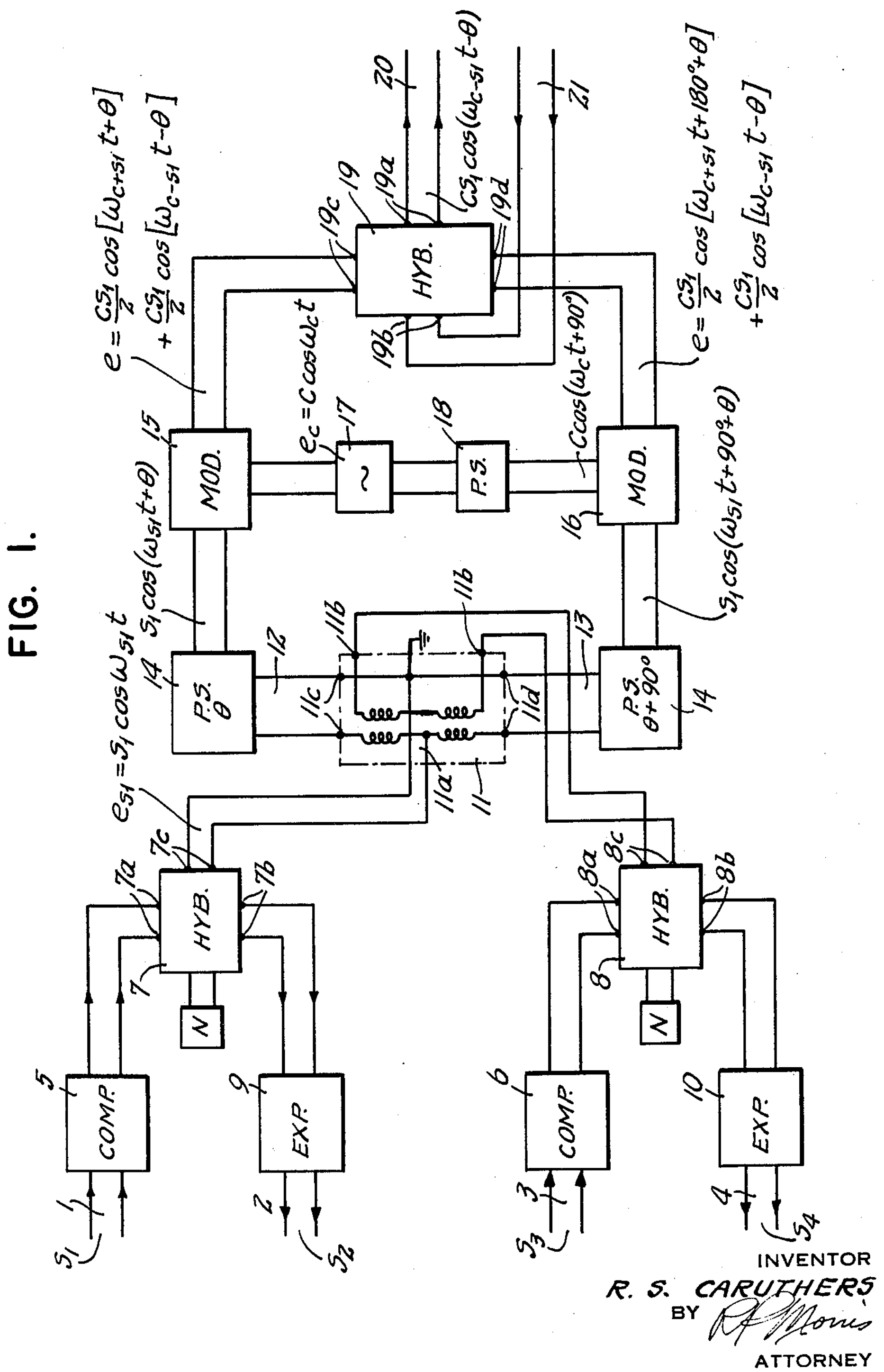
FIG. 1 is a schematic block diagram circuit of a terminal station incorporating the principles of this invention.

Turning first to FIG. 1, there is shown a circuit comprising four two-wire signal lines 1, 2, 3, and 4 carrying signals $S_1$, $S_2$, $S_3$ and $S_4$ respectively. Signals $S_1$ and $S_3$ are shown as input signals and are applied over compressors 5 and 6 to terminals **7*a* and 8*a* of hybrid circuits 7 and 8, respectively. $S_2$ and $S_4$ are the output signals and come from the output terminals 7*b*, 8*b* of hybrid circuits 7 and 8, respectively, through expander circuits 9 and 10 to the output lines 2 and 4. It will be understood that hybrid circuits 7 and 8 have the usual reversal connections so as the provide a decoupling between compressor 5 and expander 9 and compressor 6 and expander 10**, respectively.

Following through the input signal $S_1$ it will be noted that the output from hybrid 7 is applied to one terminal **11*a* of a hybrid circuit 11. Let it be assumed that this particular hybrid circuit 11 is so positioned that the input signal $S_1$ will proceed co-phasally from terminals 11*c* and 11*d* over lines 12 and 13. These signals go through phase shifters 14 which produce a net phase shift of 90° between the two signal components of $S_1$ as they are applied to modulators 15 and 16. The carrier frequency energy C from the generator 17 is applied directly to modulator 15 and through a phase shifting network 18 which produces another 90° phase shift to modulator 16. As is known in the prior art, the modulator products from the modulators 15 and 16 may be applied at terminals 19*c* and 19*d* and combined by means of another hybrid circuit 19 so as to produce a single side-band at terminals 19*a* on output lead 20**, for example, the lower side-band of the carrier frequency C and signal frequency $S_1$.

Taking the signal $S_1$ the input signal voltage $e_{s1}$ can be expressed $$e_{s1}=S_1 \cos \omega_{s1}t \quad (1)$$

where $\omega_{s1}$ represents $2\pi$ times the frequency of the signal. The input to modulator 15 is then $$S_1 \cos \omega_{s1}t+\theta \quad (2)$$

and the input to modulator 16 is $$S_1 \cos (\omega_{s1}t+90°+\theta) \quad (3)$$

The carrier voltage expressed as $$e_c=C \cos \omega_c t \quad (4)$$

is applied to modulator 15 and the carrier voltage shifted in phase 90°

$$C \cos (\omega_c t+90°) \quad (5)$$

is applied to modulator 16.

The side-band modulation products from modulator 15 may then be expressed as:

$$e=\frac{CS_1}{2} \cos [\omega_{c+s1}t+\theta]+\frac{CS_1}{2} \cos [\omega_{c-s1}t-\theta] \quad (6)$$

and from modulator 16 as:

$$e=\frac{CS_1}{2} \cos [\omega_{c+s1}t+180°+\theta]+\frac{CS_1}{2} \cos [\omega_{c-s1}t-\theta] \quad (7)$$

The side-band modulation components are applied to the hybrid circuit 19 so that the lower side-band components, that is, the second terms of Equations 6 and 7 add at terminals **19*a* and the upper side-band components cancel at this terminal. At the terminal 19*b* connected to line 21 the reverse is the case but, as lines 20 and 21** must present equal impedances in order to balance the hybrid, there will be no reflection of these upper side-band components to cause interference.

As is also known from the prior art, the lower side-band carrying another signal such as $S_2$ must be applied at terminals **19*b* through hybrid 19 on lead 21 in order to reverse the phases of the two demodulating inputs to the demodulating elements 15 and 16 to provide a signal $S_2$ which will then pass through hybrid 7 and expander 9 to output line 2**.

The operation of the demodulation system may be explained as follows.

The incoming single side-band signal may be represented by:

$$S_2C \cos \omega_{c-s_2}t \quad (8)$$

and is applied antiphasally to the modulators 15 and 16 because they are applied at terminals 19*b*. Inputs to demodulators 15 and 16 are respectively $$S_2C \cos (\omega_{c-s_2}t)$$

and $$S_2C \cos (\omega_{c-s_2}t+180°)$$

The output, to the left, of modulator 15, then appears as:

$$\frac{S_2C}{2} \cos (\omega_{s2}t) \quad (9)$$

and the output of modulator 16, because of the 90° phase shift of the carrier supplied to 16 will appear as:

$$\frac{S_2C}{2} (\cos \omega_{s2}t-90°) \quad (10)$$

Phase shifters 14 will produce a further 90° phase in the output energy from modulator 16 so that the energy applied to hybrid circuit 11 from both modulators is represented by $$\frac{S_2C}{2} (\omega_s t+\theta) \quad (11)$$

producing an addition in phase of the signals applied to hybrid 7 from terminals 11*a*. If the hybrid circuit 11 is balanced no energy will be applied to hybrid 8.

On the other hand an upper side applied at terminals 19*b* will balance out at terminals 11*a* but will add at terminals 11*b*, of hybrid 11.

This prior art system constituting simply a two-way transmission arrangement, however, can carry only two channels of voice signals, one in each direction. According to the present invention, means is provided wherein the signals may be derived from the same modulating arrangement and an additional signal channel for each direction corresponding to signals $S_3$ and $S_4$ may be provided without requiring a separate carrier source. Thus, if we start with signal $S_3$, this signal is applied through the compressor 6, terminals 8*a* of hybrid 8 and hybrid 11 to the output leads 12 and 13. However, because of the phase reversal which takes place in the hybrid network, the voice frequency signal components of $S_3$ in lines 12 and 13 will be 180° out of phase with one another instead of co-phasal as was the case in connection with signal $S_1$. As a consequence the phase shifting and modulating circuits 14, 15, 16, 17 and 18 will produce signals so that the upper side-band component of voice frequency $S_3$ will be transmitted on line 20.

An incoming single upper side-band signal carrying $S_4$ is applied over line 21 to the opposite terminal of hybrid network 19, which will be demolulated by action of the modulator circuit so as to produce at the terminal of hybrid 11 coupled to hybrid 8 the voice frequency $S_4$ which will then be applied over expander 10 to line 4.

This demodulation may be followed through similarly to the demodulation of the lower side-band as follows:

The input signal at terminals 19*b* is:

$$S_4C \cos \omega_{c+s_4}t \quad (12)$$

This signal appears at the input of modulator 15 the same as in (12) but at the input of modulator 16 it appears as:

$$S_4C[\cos \omega_{c+s_4}t-180°] \quad (13)$$

The output of modulator 15 appears as:

$$\frac{S_4C}{2} \cos (\omega_{s_4}t-\theta) \quad (14)$$

at the terminals 11*c* of hybrid 11.

The output of modulator 16 is:

$$\frac{S_4C}{2} [\cos \omega_{s_4}-180°-90°]$$

$$=\frac{S_4C}{2} [\cos \omega_{c+s_4}t+90°] \quad (15)$$

which in turn appears at terminals 11*d* as:

$$\frac{S_4C}{2} [\cos \omega_{s_4}+180°+\theta] \quad (16)$$

Thus this signal will balance out at terminals 11*a* but will add at terminals 11*b*.

It will thus be seen that if proper balance could be obtained in all of the hybrid networks, the four channels, two in each direction, may be transmitted over the common modulator circuit to the carrier lines 20 and 21 and signal lines 1 through 4. However, in any hybrid network it is not generally possible to obtain a complete balance. Accordingly, there will tend to be a certain amount of cross-talk. In a speech signal band with the usual balancing arrangements, it is possible to obtain from 30 db to 35 db differential between the signal and the cross-talk components. By use of the speech compressors and expanders, a further improvement of from 25 to 30 db can be obtained so that the total differential between these signals and the cross-talk will be between 55 db to 65 db, which makes a completely satisfactory operating speech circuit.

Figure 2:
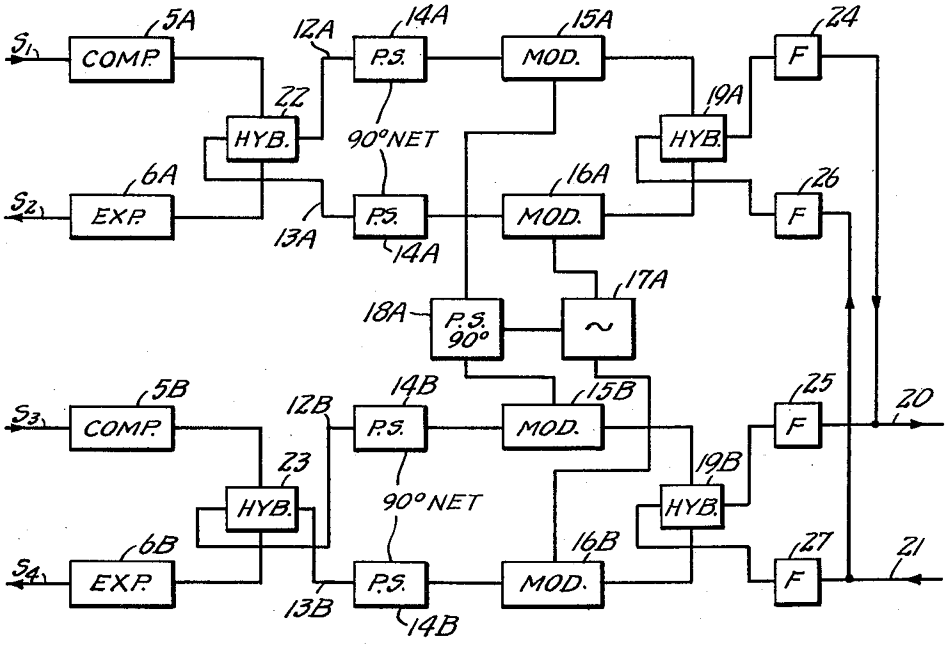
FIG. 2 is a schematic block diagram of an alternative circuit incorporating the principles of this invention.

In FIG. 2 is shown a modified type of circuit which will also serve to produce output signals in each of two single side-band carrier transmission lines 20 and 21 similar to those produced by the circuit of FIG. 1. In this figure the compressors and expanders, the phase shifting networks and the modulators are similar in operation to those described in FIG. 1 and are similarly numbered, except that they are followed with the letters A and B to distinguish the modulators for $S_1$, $S_2$, and $S_3$, $S_4$. A common carrier source 17A supplies the carrier frequency energy directly to modulators 16A and 16B and over a phase shifter 18A to modulators 15A and 15B. In this circuit, however, instead of having three separate input hybrids 7, 8 and 11 as in FIG. 1, two hybrid networks 22 and 23 are provided, the former associated with $S_1$ and $S_2$ and the modulator circuits 14A through 16A and the latter being associated with signals $S_3$ and $S_4$ and the modulator circuits 14B, 15B and 16B. It will be noted that the output leads 12A and 13A are then taken from opposite terminals of hybrid network 22 to produce the desired output side-band at hybrid network 19A and that the output leads to 12B and 13B are taken from opposite terminals of hybrid network 23 to produce the desired side-band components at the output of hybrid 19B. It should be further noted that leads 12B and 13B are oppositely poled in their connections to modulators 14B compared to leads 12A and 12B in their connections to modulators 14A in order that the lower side-band of signal $S_3$ will appear on output lead 20 of hybrid 19B. Thus, upper and lower side-bands, respectively, of signals $S_1$ and $S_3$ will be applied to line 20. Because there may not be proper balance in the hybrid network 19A and 19B, filters 24 and 25 may be provided to assure the passage of the proper upper and lower side-bands, respectively, to the output line 20. Similarly the input carrier side-bands incoming over line 21 may be first filtered through filter networks 26 and 27 before application to the input terminals of hybrid circuits 19A and 19B, which terminals are opposite to the output terminals of these hybrids.

While the circuit of FIG. 2 uses two separate modulator circuits, it still operates on a single carrier frequency source and produces in the output lines the desired single side-band signals.

Figure 3:
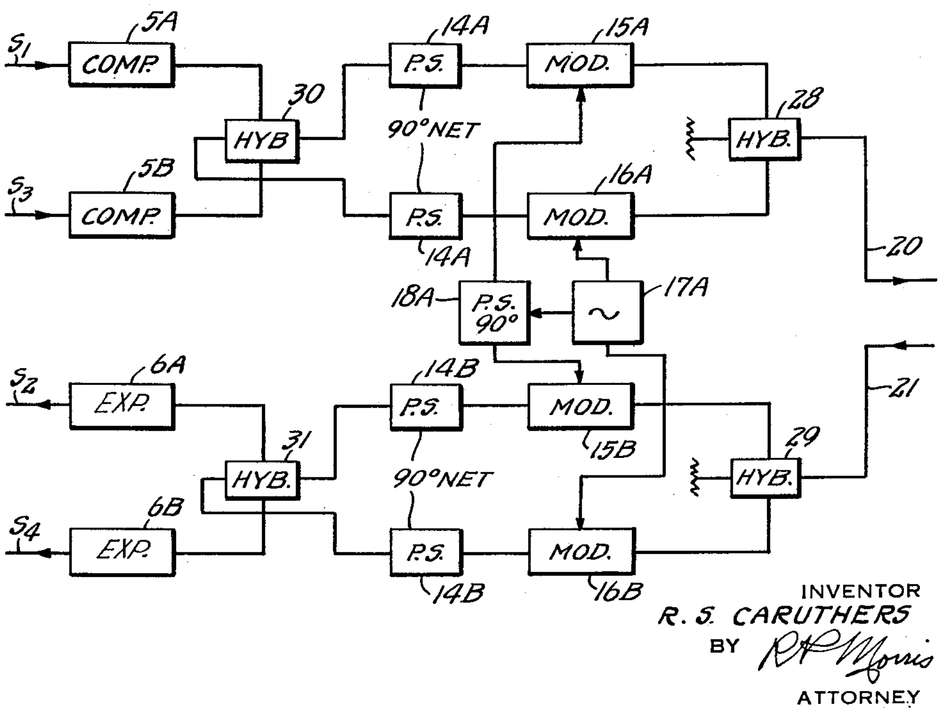
FIG. 3 is a schematic block diagram of a still further modification in accordance with the principles of this invention.

The modification shown in FIG. 3 is quite similar to that shown in FIG. 2, except that in this arrangement the two signals $S_1$ and $S_3$ are applied through a common hybrid 28 to produce directly in the output lead 20 the separate upper and lower side-band signals. With this arrangement, the output hybrid network 28 can be the simple type of conventional hybrid with both outputs applied to one terminal and the opposite terminal being connected to the usual balancing network. Similarly, the incoming side-band signals on line 21 are applied through hybrid network 29 to the modulator circuits 15B and 16B to provide output signals $S_2$ and $S_4$ in the output leads. The only hybrid networks, therefore, which are required for this system are the input hybrid networks 30 and 31 and the output hybrid networks 28 and 29, corresponding substantially in structure to the hybrid networks of FIG. 2. The remaining components of FIG. 3 are substantially similar to those of FIG. 2 have been given similar reference characters.

While there has been disclosed three modifications of the circuit in accordance with this invention it is to be clearly understood that these are given only by way of example and are not to be considered as any limitations on the scope of the invention. Once the principles of the invention are understood, many varied modifications of the circuits in accordance with this invention may be readily provided without the exercise of inventive skill.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A combined upper and lower sideband system for transmitting and receiving two signals simultaneously on a single frequency carrier wave comprising a low frequency signal converter and a high frequency signal converter, each converter having a first channel and a second channel associated therewith, means in the low frequency converter for converting first channel input signals into a pair of co-phasal signals and for converting second channel input signals into a pair of anti-phasal signals, a pair of circuit branches interconnecting said signal converters, means for generating a carrier wave of a predetermined frequency, first means for connecting the said carrier wave to one of said branches and second means including means for phase shifting said carrier wave and connecting it to said other branch, means in each of said circuit branches for phase-shifting one signal of each pair of converted channel signals, for modulating said carrier waves with said converted channel signals and for transferring said modulated carrier waves to said high frequency converter, means in the high frequency converter for combining said transferred modulated carrier waves into a lower sideband carrier comprised of the said predetermined frequency modulated by said first channel input signals and into an upper sideband carrier wave comprised of the said predetermined frequency modulated by said second channel input signals, and means in the high frequency converter for transferring the said sideband waves over said its first associated channel.

2. In the combined upper and lower sideband system of claim 1, means in said high frequency signal converter for converting its said second associated channel input upper and lower sideband carrier signal into a pair of anti-phasal signals, and for applying said anti-phasal signals to said branches, said carrier having the same frequency as said carrier wave generating means, means in each of said circuit branches for demodulating each of said converted sideband signals, for phase shifting said demodulated converted sideband signals and for transferring said phase shifted demodulated sideband signals to said low frequency converter, and means in said low frequency converter for combining said transferred demodulated signals into a first low frequency signal on its said first associated channel and a second low frequency signal on its said second associated channel.

3. A combined upper and lower sideband system for transmitting and receiving two signals simultaneously on a single frequency carrier wave comprising a low frequency converter and high frequency signal converter, each converter having a first and a second channel associated therewith, means in the high frequency converter for converting second channel upper and lower sideband carrier signals said upper sideband carrier signal comprising a first low frequency signal, said lower sideband carrier signal comprising a second low frequency signal into pairs of anti-phasal signals, a pair of circuit branches interconnecting said signal converters, means for generating a carrier wave of a predetermined frequency equal to the carrier frequency of said sideband signals, first means for connecting the said carrier wave to one of said branches, second means including phase shift means for phase shifting said carrier wave and connecting it to said other branch, means in each of said circuit branches for demodulating each of said converted sideband signals and for transferring said phase shifted demodulated converted sideband signal to said low frequency converter and means in said low frequency converter for combining said transferred demodulated signals into said first low frequency signal on its said first associated channel and said second low frequency signal on its said second channel.

4. The upper and lower sideband system of claim 3 wherein said frequency converter means comprise hybrid networks.

5. In the upper and lower sideband system of claim 4 other hybrid network means for separating each of said channels associated with said low frequency converter into transmit and receive channels, means associated with said receive channels for expanding signals received thereon, and means associated with said transmit channels for compressing signals transmitted thereover.

6. The upper and lower sideband system of claim 4 wherein one of each of the channels associated with said high frequency converters is connected to a balancing network.

References Cited in the file of this patent

UNITED STATES PATENTS

| | | |
|---|---|---|
| 1,559,867 | Griggs | Nov. 3, 1925 |
| 1,666,206 | Hartley | Apr. 17, 1928 |
| 2,151,464 | Curtis | Mar. 21, 1939 |
| 2,248,250 | Peterson | July 8, 1941 |
| 2,370,853 | Fairley | Mar. 6, 1945 |
| 2,695,332 | Caruthers | Nov. 23, 1954 |
| 2,705,752 | Pound | Apr. 5, 1955 |
| 2,774,041 | Finch et al. | Dec. 11, 1956 |
| 2,781,417 | Bower | Feb. 12, 1957 |
| 2,830,288 | Diche | Apr. 8, 1958 |
| 2,835,739 | Eusink | May 20, 1958 |
| 2,903,518 | Kahn | Sept. 8, 1959 |
| 2,960,573 | Hodgson et al. | Nov. 15, 1960 |

FOREIGN PATENTS

| | | |
|---|---|---|
| 19,777 | Australia | Oct. 17, 1934 |